(12) United States Patent
Zank

(10) Patent No.: US 7,841,669 B2
(45) Date of Patent: Nov. 30, 2010

(54) WHEEL BALANCING WEIGHTS WITH BODY AND MOUNTING CLIP

(75) Inventor: Christopher Charles Zank, Murfreesboro, TN (US)

(73) Assignee: Perfect Equipment Inc., Lavergne, TN (US)

( * ) Notice: Subject to any disclaimer, the term of this patent is extended or adjusted under 35 U.S.C. 154(b) by 212 days.

(21) Appl. No.: 12/169,803

(22) Filed: Jul. 9, 2008

(65) Prior Publication Data

US 2010/0007194 A1 Jan. 14, 2010

(51) Int. Cl.
*B60B 1/00* (2006.01)
(52) U.S. Cl. .................................... 301/5.21
(58) Field of Classification Search .......... 301/5.21, 301/5.22
See application file for complete search history.

(56) References Cited

U.S. PATENT DOCUMENTS

| | | | | |
|---|---|---|---|---|
| 2,137,416 A | * | 11/1938 | Rubsam | 301/5.21 |
| 2,248,265 A | * | 7/1941 | Wright | 301/5.21 |
| 2,258,011 A | * | 10/1941 | Inman | 301/5.21 |
| 2,469,997 A | * | 5/1949 | Simpson | 301/5.21 |
| 2,696,408 A | * | 12/1954 | Merriman | 301/5.21 |
| 3,280,637 A | * | 10/1966 | Ealey et al. | 73/457 |
| 3,495,877 A | * | 2/1970 | Morne | 301/5.21 |
| 5,350,220 A | * | 9/1994 | Atwell, Jr. | 301/5.21 |
| 5,733,016 A | * | 3/1998 | Brown | 301/5.21 |
| 6,238,005 B1 | * | 5/2001 | Sugayauchi et al. | 301/5.21 |
| 6,250,721 B1 | * | 6/2001 | Oba et al. | 301/5.21 |
| 6,364,421 B1 | | 4/2002 | Pursley | |
| 6,364,422 B1 | * | 4/2002 | Sakaki et al. | 301/5.21 |
| 6,553,831 B1 | | 4/2003 | Schmidt et al. | |
| 7,216,938 B2 | * | 5/2007 | Phillips | 301/5.21 |
| 7,249,804 B2 | | 7/2007 | Zank et al. | |

FOREIGN PATENT DOCUMENTS

JP 63291702 A * 11/1988

* cited by examiner

*Primary Examiner*—Russell D Stormer
(74) *Attorney, Agent, or Firm*—Law Office of Steven H. Meyer, LLC (57) ABSTRACT

A wheel balancing weight has a body for providing mass and a clip attached to the body to securely grip a flange of a wheel. The clip defines a compartment within which is received the flange, and includes a hump projecting toward and into the defined compartment to contact a generally radially inward surface of the received flange such that the received flange contacts the clip at relatively smooth medial contact points on the hump. The weight may be formed as a unitary member from a sheet of steel and have a unitary sheet steel body and sheet steel clip.

20 Claims, 4 Drawing Sheets

WHEEL BALANCING WEIGHTS WITH BODY AND MOUNTING CLIP

CROSS-REFERENCE TO RELATED APPLICATION(S)

The present application is filed concurrently with and shares a common title and disclosure with the following applications, each of which is hereby incorporated herein by reference in its entirety:

U.S. patent application Ser. No. 12/169,827; and
U.S. patent application Ser. No. 12/169,844.

FIELD

The present disclosure relates to wheel balancing weights for being mounted to a wheel of a vehicle or the like to balance same. More particularly, the present disclosure relates to wheel balancing weights with a clip that minimizes marring of the mounted-to wheel.

BACKGROUND

In the manufacture of pneumatic tires and also wheels and rims for pneumatic tires, it is exceedingly difficult if not impossible to produce a tire, a wheel, or the combination thereof in perfect rotational balance. As known, when out of balance, such a tire, wheel, or combination thereof, vibrates excessively upon rotation and can cause damage to adjacent, coupled-to and/or related components. Moreover, when the tire and wheel are coupled to a moving vehicle such as a passenger car, the vibration can be uncomfortable to an occupant of the vehicle.

Accordingly, and as is known, such tire, wheel, or combination thereof is balanced by appropriately applying one or more counter-balancing weights to compensate for a measured imbalance. Typically, although by no means absolute, in the case where a tire is mounted to a wheel of a vehicle, the wheel includes a circumferential flange or lip at a rim on either axial side thereof and a weight of appropriate mass is applied at each flange at an appropriate circumferential location thereof. Methods of measuring imbalance and determining where to apply the counter-balancing weights are generally known to the relevant public and therefore need not be described herein.

Heretofore, such a counter-balancing weight for a vehicle has been constructed to have a body forming the majority of the mass of the weight and a clip by which the body is secured to the flange of a wheel, where the clip is attached to the body by any of several attaching mechanisms. For example, the clip may be swaged to a face of the body or affixed to a face of the body by way of one or more screws, rivets, expansion bolts, or the like. Additionally, the body may be formed from a molten material such as lead or the like around a clip formed from sheet steel or the like.

Notably, the clip is typically formed by appropriate bending of a piece of sheet steel or the like into a springed shape that defines a compartment within which is received the aforementioned flange of the wheel. In mounting such a formed clip to such a flange, contact is made with the flange at lateral edges of the clip, among other locations. As may be appreciated, such lateral contacting edges are relatively sharp and therefore tend to scratch or otherwise mar such flange as such clip is mounted thereto and also removed therefrom.

While such scratching or marring is generally minimal and not especially destructive to the flange and wheel, such scratching or marring can nevertheless remove a protective coating from the flange and wheel and allow water to penetrate thereinto, which of course can lead to rusting or other corrosion and subsequent decomposition and failure of the wheel. Moreover, if the flange and wheel is especially decorative, such as for example by being constructed to include a chrome surface, the scratching or marring of such decorative flange and wheel is especially unwanted and to be avoided.

Accordingly, a need exists for a wheel balancing weight with a clip and a body, where the clip is constructed in such a manner so as to minimize or avoid scratching or marring the flange of a wheel when the clip is mounted thereto and removed therefrom. More particularly, a need exists for such a wheel balancing weight where the clip thereof is formed so as to avoid contacting the flange of the wheel at lateral edges of such clip. Still more particularly, a need exists for such a wheel balancing weight where the clip includes a hump or the like extending into the compartment thereof such that contact with the flange occurs at such hump rather than at the lateral edges of such clip.

SUMMARY

The aforementioned need is satisfied by a wheel balancing weight for mounting to a wheel with a flange. The weight has a body for providing a predetermined mass to the weight and a clip attached to the body. The clip is for securely gripping the flange to mount the weight thereto, and has a springed shape defining a compartment within which is received the flange of the wheel. The clip includes a hump projecting toward and into the defined compartment to contact a generally radially inward surface of the received flange such that the received flange contacts the clip at one or more relatively smooth medial contact points on the hump. Each medial contact point is away from adjacent relatively sharp lateral edges of the clip, whereby the flange is not damaged by the relatively sharp lateral edges when received in and removed from the compartment defined by the clip.

Such a weight may alternately be formed as a unitary member from a sheet of steel and have a unitary sheet steel body and sheet steel clip such that the sheet steel clip as formed is attached to and coupled with the sheet steel body as formed. The sheet steel body may include a central sheet steel portion laterally flanked by and interposed between a pair of opposing lateral sheet steel wing portions, and/or may be formed from an elongate portion of sheet steel folded a number of times in a generally radial direction with respect to the mounted-to wheel such that the sheet steel body includes a number of folded sheet steel layers.

BRIEF DESCRIPTION OF THE DRAWINGS

The foregoing summary as well as the following detailed description of various embodiments of the present invention will be better understood when read in conjunction with the appended drawings. For the purpose of illustrating the various embodiments of the invention, there are shown in the drawings embodiments that are presently preferred. As should be understood, however, the invention is not limited to the precise arrangements and instrumentalities shown. In the drawings.

DETAILED DESCRIPTION OF PREFERRED EMBODIMENTS

Certain terminology may be used in the following description for convenience only and is not considered to be limiting. For example, the words "left", "right", "upper", "lower", "top", "bottom", "front", and "back" designate directions in the drawings to which reference is made. Likewise, the words "inwardly" and "outwardly" are directions toward and away from, respectively, the geometric center of the referenced object. The terminology includes the words above specifically mentioned, derivatives thereof, and words of similar import.

Wheel Balancing Weights in General

Figure 1:
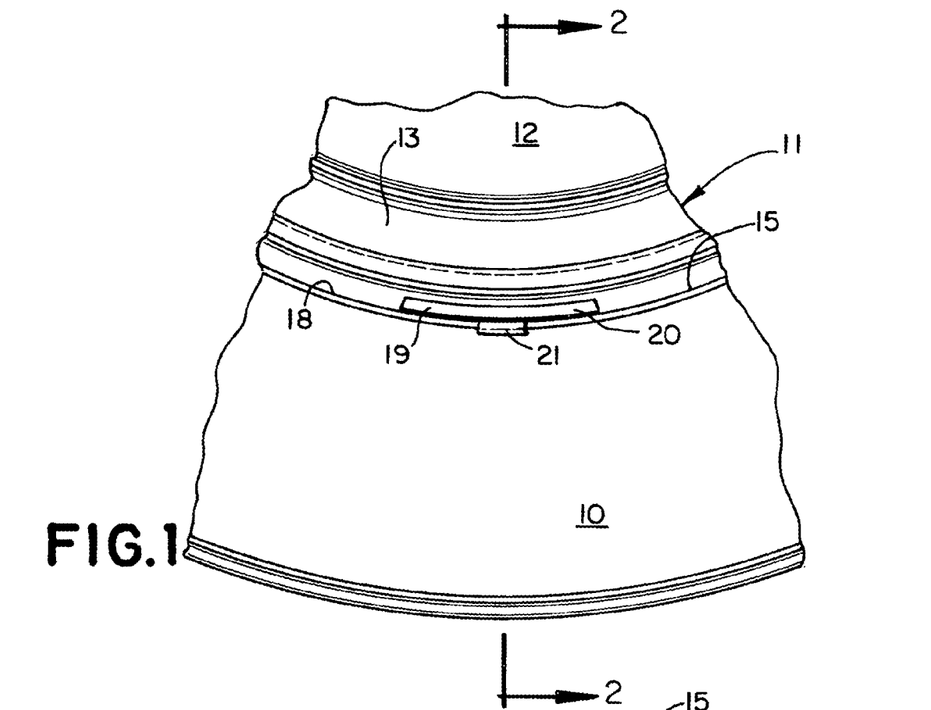
FIG. 1 is a broken-away perspective view of a wheel balancing weight in accordance with one embodiment of the present invention, where the weight is mounted to a rim of a wheel.
Figure 2:
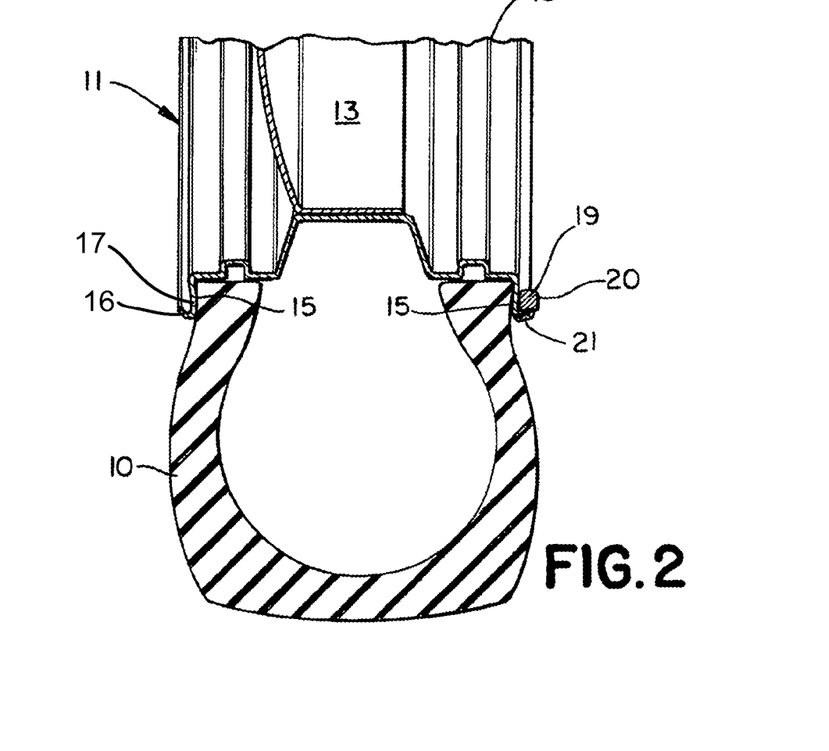
FIG. 2 is a cross-sectional view of the weight and wheel of FIG. 1 taken along the line 2-2 of FIG. 1.

As shown in FIG. 1 and 2, a pneumatic or other tire 10 such as may be used in connection with an automotive vehicle or the like is mounted upon a rim 11 of a vehicle wheel 12 or the like. Examples of such a tire 10, rim 11, and wheel 12 are shown and disclosed in U.S. Pat. Nos. 6,553,831, 7,216,938 and 7,249,804, all hereby incorporated by reference in their entirety.

It is to be appreciated that the tire 10 may be mounted to the wheel 12 in any conventional or unconventional manner and that the tire 10 may be of any variety or manufacture without departing from the spirit or scope of the present invention. The tire 10 and wheel 12 or wheel 12 alone may be balanced manually or by spin balancing or by any other method without departing from the spirit and scope of the present invention.

As is known, a wheel 12 and a wheel 12 with tire 10 mounted thereupon are balanced with respect to the rotational axis thereof and in particular can be balanced on both the axially inboard and outboard sides of the wheel 12 at or about the rim 11 thereof. Generally, a wheel 12 with or without a tire 10 mounted thereupon is balanced by measuring the imbalance and then attaching a weighted mass or weight 20 at a circumferential location on the rim 11 of the wheel 12 such that the measured imbalance is counter-balanced by the weight 20. Such balancing is often performed on both the inboard and outboard sides of the wheel 12.

Typically, the rim 11 of a wheel 12 at each axial side thereof extends both axially and circumferentially. The wheel 12 also includes a central well portion 13 through which bolts on a vehicle typically extend to attach the wheel 12 to such vehicle. As seen in FIGS. 1 and 2, the rim 11 includes a flange 15 extending generally axially and/or radially outwardly from the rim 11 and circumferentially around the rim 11. The rim 11 typically has an inboard flange 15 corresponding to an inboard side of the tire 10 and an outboard flange 15 corresponding to an outboard side of the tire 10, as is seen in FIG. 2.

Each flange 15 as shown may be constructed during formation of the wheel 12 by crimping or otherwise forming a portion of the rim 11 so as to create a generally axially extending lip 16. As seen in FIG. 2, the lip 16 may reside at the distal portion of a generally radially outwardly extending brim 17. As may be appreciated, in addition to radially displacing the lip 16 from the main portion of the rim 11, the brim 17 also acts to secure the pneumatic tire 10 onto the rim 11. Also, acting together, the lip 16 and the brim 17 of the flange 15 define a pocket 18 (FIG. 1) within which the weighted body 19 of a wheel balancing weight 20 may be nestled to achieve proper balancing. As may be appreciated, the pocket 18 defined by the flange 15 extends generally circumferentially with respect to the wheel, and the weighted body 19 typically also extends in an arcuate manner so as to follow the generally circumferential pocket 18 and be nestled therein, as is seen in FIGS. 3 and 4.

It is to be recognized that the flange 15 may also have other dimensional features without departing from the spirit and scope of the present invention. As shown in FIG. 2, the flange 15 extends generally axially and generally radially outwardly in a J-shape as viewed in toroidal cross-section, but it should be understood that the flange 15 may extend in another direction. Additionally, the flange 15 may vary in dimension, location and in number, all without departing from the spirit and scope of the invention.

Figure 3:
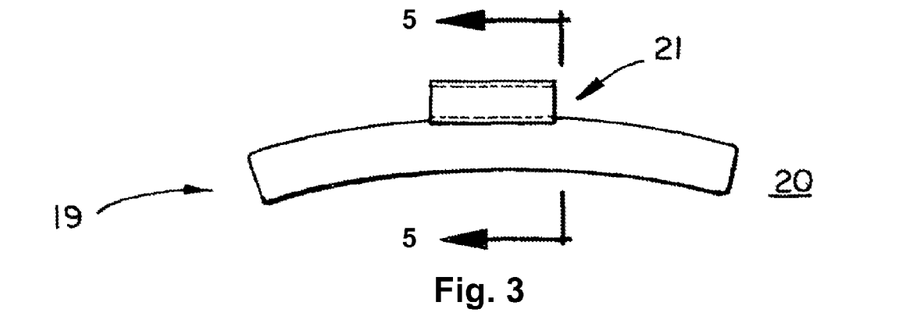
FIGS. 3 and 4 are outboard and inboard side views of the weight of FIGS. 1 and 2, respectively.
Figure 4:
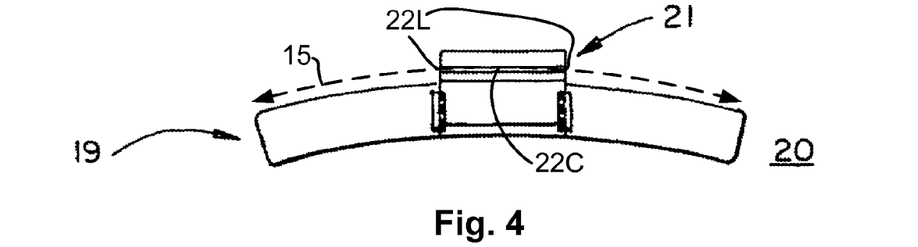
Figure 5:
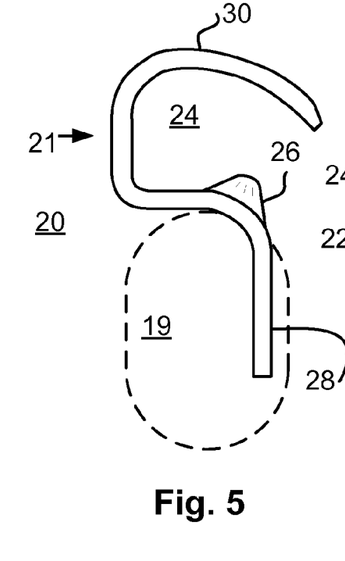
FIG. 5 is a toroidal view of a wheel balancing weight in accordance with one embodiment of the present invention, where the toroidal view is akin to the view taken along the line 5-5 in FIG. 3.

As best seen in FIGS. 3 and 4, the body 19 of the weight 20 typically is formed to have an outboard face (FIG. 3) for facing generally axially away from the mounted-to wheel 12, an inboard face (FIG. 4) for facing toward the mounted-to wheel 12 and the brim 17 of the flange 15 of the rim 11 thereof, an outer radial face (top of FIGS. 3 and 4) for facing generally toward the lip 16 of the flange 15, and a inner radial face (bottom of FIGS. 3 and 4) for facing generally opposite the radially outer face. As shown, the inboard and outboard faces are generally planar and the inner and outer radial faces are generally curved (as shown in FIG. 5). As should be appreciated, however, the body 19 as shown in FIGS. 1-5 is merely exemplary and may have other facial configurations.

Notably, the body 19 may be formed to closely follow the lip 16 and brim 17 of the flange 15 of the rim 11 when the weight 20 is mounted to such rim 11 at such flange 15. Thus, such body 19 is more intimately nestled within the pocket 18 defined by the flange 15 when the weight 20 is mounted to such flange 15 at an appropriate circumferential location thereof. As was set forth above, the weighted body 19 of the weight 20 should be well-nestled in such pocket 18 to achieve proper balancing.

Typically, a wheel balancing weight 20 such as that shown in FIGS. 1-4 includes a clip 21 for attaching the weighted body 19 thereof to the flange 15 of the wheel 12. The clip 21 is constructed in an appropriate shape and manner from a durable material such as spring steel so that the clip 21 securely grips the flange 15 and attaches the body 19 thereto while nestling same in the pocket 18 formed by such flange 15. The body 19 may be constructed from a material such as steel, lead, zinc, or the like so as to impart a particular mass to the weight 20.

As is shown in FIGS. 3 and 4, the body 19 and clip 21 may be formed separately and then attached to form the weight 20.

Alternately, the clip 21 may be formed first and the body 19 may then be formed around such clip 21, for example by positioning molten lead around a portion of the formed clip 21, perhaps with the aid of a mold. Also alternately, the body 19 and clip 21 may be formed together as a unitary body.

As was set forth above, the clip 21 is typically formed by appropriate bending of a piece of sheet steel or the like into a springed shape that defines a compartment 24 (FIG. 5) within which is received the aforementioned flange 15 of the wheel 12. In mounting such a formed clip 21 to such a flange 15, contact is made with the flange 15 at contact points that include lateral edges of the clip 21. With reference to FIG. 4 in particular, inasmuch as the flange 15 is generally arcuate (as represented by the dashed line) but the bent clip 21 is generally linear in a direction tangential to the arcuate flange 15, a generally radially inward surface of the flange 15 (bottom side in FIG. 4) in point of fact contacts the clip 21 at lateral contact points 22L which correspond to the lateral edges of such clip 21, while a generally radially outward surface of the flange 15 (top side in FIG. 4) contacts the clip 21 at a central contact point 22C which is generally laterally centered.

As was also set forth above, the lateral contact points 22L at the contacting edges are relatively sharp, and therefore tend to scratch or otherwise mar the flange 15 as such clip 21 is mounted thereto and also removed therefrom. While such scratching or marring is generally minimal and not especially destructive to the flange 15 and wheel 12, such scratching or marring can nevertheless remove a protective coating from the flange 15 and wheel 12 and allow water to penetrate thereinto, which of course can lead to rusting or other corrosion and subsequent decomposition and failure of the wheel 12. Moreover, if the flange 15 and wheel 12 is especially decorative, such as for example by being constructed to include a chrome surface, the scratching or marring of such decorative flange 15 and wheel 12 is especially unwanted and to be avoided.

Wheel Balancing Weight with Hump in Clip

Figure 6:
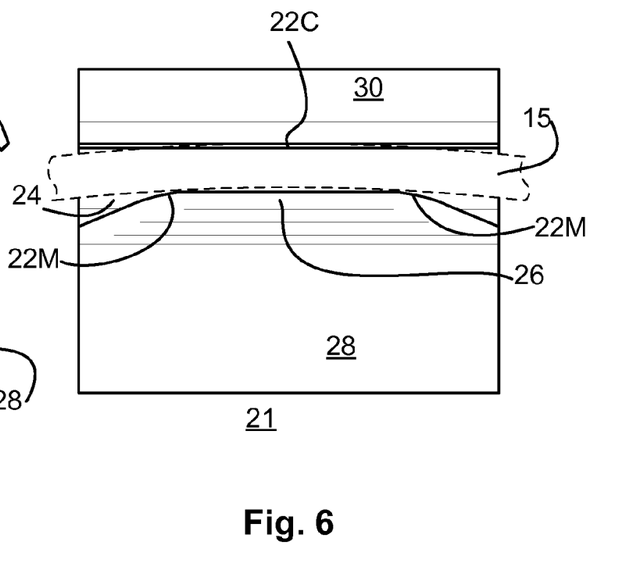
FIG. 6 is an inboard side view of the clip of the weight of FIG. 5, where the inboard side view is akin to the view from the right toward the left in FIG. 5.

Accordingly, and in various embodiments of the present invention, and referring now to FIGS. 5 and 6, the clip 21 of the weight 20 is provided with a hump 26 that projects toward and into the compartment 24 defined by such clip 21. With such hump 26, and as best seen in FIG. 6, the generally radially inward surface of the flange 15 (bottom side in FIG. 6) in point of fact contacts the clip 21 at one or more medial contact points 22M which are away from the lateral edges of such clip 21, and thus not at the aforementioned lateral contact points 22L (FIG. 4) at such lateral edges. Significantly, such medial contact points 22M are not sharp but instead are relatively free of any features that would tend to scratch or otherwise mar the flange 15 as such clip 21 is mounted thereto and also removed therefrom. Thus, damage to the flange 15 and wheel 12 relating to such medial contact points 22M is minimized if not eliminated by the clip 21 of FIGS. 5 and 6.

As may be appreciated, a weight 20 having the clip 21 of FIGS. 5 and 6 has a general shape and structure akin to that of prior art weights. Thus, the body 19 is generally arcuate and extends generally transversely and circumferentially for some distance that generally corresponds to a stated mass of the weight 20, and the clip 21 extends generally tangentially with respect to the arcuate body 19. However, the shape and structure of the clip 21 in particular does differ based on the presence of the hump 26.

As may be appreciated with regard to FIG. 5, the clip 21 with the hump 26 may be embedded within the body 19 of the weight 20, or may be affixed to the body 19 within a recess (not shown) in the inboard face of such body 19 by way of screws, rivets, swaging, or the like. In either case, the clip 21 has an attaching portion 28 by which the clip 21 is attached to the body 19, and a gripping portion 30 that includes the hump 26 and that defines the compartment 24. As best shown in FIG. 5, the attaching portion 28 of the clip 21 is generally planar and generally parallel to the inboard and outboard faces of the body 19, although such attaching portion 28 may have other configurations.

As also best shown in FIG. 5, the gripping portion 30 of the clip 21 continues from the attaching portion 28 in a generally radial direction and away from the outer radial face of the body 19 and is bent or otherwise shaped to include a number of curves. In particular, the gripping portion 30 as shown continuing from the attaching portion 28 curves firstly to a generally axial direction and extends generally toward a plane defined by the outboard face of the body 19, then curves secondly to a generally radial direction and extends generally within such plane defined by the outboard face of the body 19 and away from such body 19, then curves thirdly back to a generally axial direction and extends generally toward a plane defined by the inboard face of the body 19, and then curves fourthly to a direction between an axial direction and a radial direction and extends through the plane defined by the inboard face of the body 19 and also radially inwardly to a distal end.

Notably, the gripping portion 30 of the clip 21 as bent defines the compartment 24 within which the flange 15 of the wheel 12 is received when the weight 20 is mounted to such flange 15. In particular, the compartment 24 as defined by the gripping portion 30 of the clip 21 curves in toroidal cross-section in a manner akin to the lip 16 of the flange 15, and the compartment 24 as defined by the gripping portion 30 of the clip 21 is appropriately dimensioned so that such lip 16 may be fitted into such compartment 24 and securely gripped by such gripping portion 30 of the clip 21 when the weight 20 having such clip 21 is mounted to the flange 15. As should be appreciated, however, the gripping portion 30 of the clip 21 as shown in FIGS. 5 and 6 is exemplary and may have other bent configurations while defining the compartment 24. For example, the clip 21 may emerge from the body 19 at a different location and/or at an angle with respect to the outboard face of the body 19.

Notably, the clip 21 as bent into any particular configuration may be formed in any appropriate manner without departing from the spirit and scope of the present invention. Typically, although not necessarily, such forming does in fact occur by bending a slug cut from sheet steel, where the slug is bent against one or more dies by way of an appropriate machine. As seen in FIGS. 5 and 6, all such bending takes place so that the formed clip 21 is generally linear in a direction tangential to the flange 15 of the wheel 12 when the weight having the clip 21 is mounted to such flange 15. That is, such bending is generally normal to such linear direction.

In various embodiments of the present invention, a clip 21 such as that shown in FIGS. 5 and 6 is formed to include the hump 26 such that the hump 26 resides generally in the area of the gripping portion 30 that (firstly) curves from the attaching portion 28 to the generally axial direction, as is shown in FIG. 5. As also shown in FIGS. 5 and 6, the hump 26 is generally centered between the lateral edges of such gripping portion 30 of such clip 21 and projects into the compartment 24 generally outwardly radially and thus away from the outer radial face of the body 19, although such hump 26 may also project a relatively slight amount in a generally inboard axial direction such that the hump 26 projects more toward the distal end of the clip 21.

Figure 11:
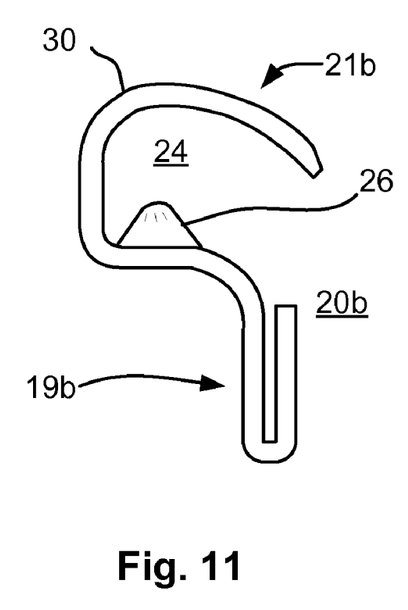
FIG. 11 is a toroidal view of a clip similar to that shown in FIG. 10 but with variations in a hump and in folds.

In other various embodiments of the present invention, a clip 21 such as that shown in FIG. 11 is formed to include the hump 26 such that the hump 26 resides generally in the area of the gripping portion 30 that extends in a generally axial direction. In FIG. 11, then, the hump 26 is more deeply recessed within the compartment 24 and projects more radially as compared with the hump 26 of FIG. 5. Accordingly, such hump 25 of FIG. 11 projects more toward where the gripping portion 30 curves (thirdly) back to a generally axial direction.

At any rate, and as may be appreciated, the hump 26 is positioned in the gripping portion 30 of the clip 21 so that the flange 15 of the wheel 12 as received within the compartment 24 is securely gripped between one or more medial contact points 22M on such hump 26 (two being shown in FIG. 6) and a central contact point 22C toward the distal end of the gripping portion 30 of the clip 21, where the central contact point 22C is generally laterally centered on a generally radially inwardly facing surface of the gripping portion 30 of the clip 21. Thus, the hump 26 contacts a generally radially inward side of the flange 15 and the distal end of the clip with the central contact point 22C contacts a generally radially outward side of such flange 15.

As best seen in FIG. 6, the hump 26 is formed within the compartment 24 of the gripping portion 30 of the clip 21 such that the hump 26 has a generally laterally extending central plateau interposed between opposing lateral ramps. As seen, the central plateau is generally linear and generally tangential with respect to the flange 15 when the clip 21 is mounted thereto, and is elevated with respect to the adjacent lateral edges of the clip 21. Thus, the central plateau is closer to the distal end of the clip 21 than the adjacent lateral edges such that the hump 26 indeed projects from the clip 21 into the compartment 24 defined thereby. The ramps are also generally linear but are at an angle to the central plateau such that each ramp transitions from the elevated plateau to a respective adjacent lateral edge.

Notably, and as is best seen in FIG. 6, the ramps of the hump 26 are dimensioned so that the received flange 15 does not contact lateral contact points 22L at the adjacent lateral edges of the clip (as is the case in FIG. 4). Instead, and as also seen, the received flange 15 contacts the hump 26 in the area of the medial contact points 22M which are at about the juncture of the central plateau with each ramp. As should be appreciated, such juncture is smoothed and not jagged or abrupt so that no tangentially-oriented edge or other sharp feature is present that could damage or otherwise mar the received flange 15. Likewise, and as seen in FIG. 5, the hump is in general also smoothed and not jagged or abrupt so that no edge or other sharp feature in a direction normal to the tangential direction is present that could damage or otherwise mar the received flange 15.

The clip 21 may be formed to include the hump 26 in any appropriate manner without departing from the spirit and scope of the present invention. For example, the hump 26 may be formed by pressing the clip 21 against an appropriate die by way of an appropriate machine, either before, during, or after the clip is bent to impart the aforementioned curves.

Inasmuch as the clip 21 as seen in FIGS. 5 and 6 is formed from a slug of sheet steel, and in various embodiments of the present invention, a weight 20a, 20b including a clip 21a, 21b akin to the clip 21 and a body 19a, 19b may also be formed as a unitary member from a slug of such sheet steel, as is seen in FIGS. 7-10. In such a situation, and as should be understood, the weight 20a, 20b including the body 19a, 19b and clip 21a, 21b is formed by bending and/or pressing and/or folding a slug cut from sheet steel against one or more dies by way of an appropriate machine. Such bending and pressing and folding would be in a manner set forth above or should be apparent to the relevant public and therefore need not be set forth herein in any detail other than that which is provided.

Figure 7:
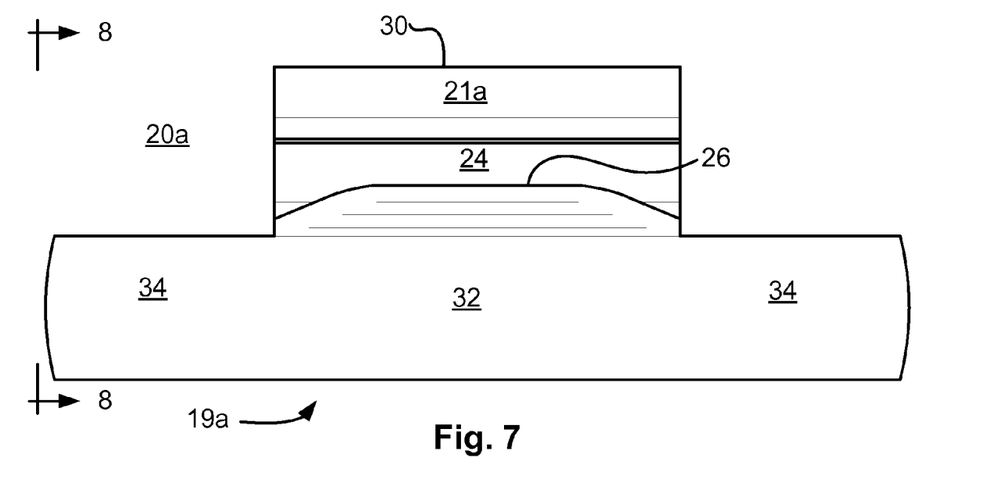
FIG. 7 is an inboard side view of a weight with a clip in accordance with another embodiment of the present invention.
Figure 8:
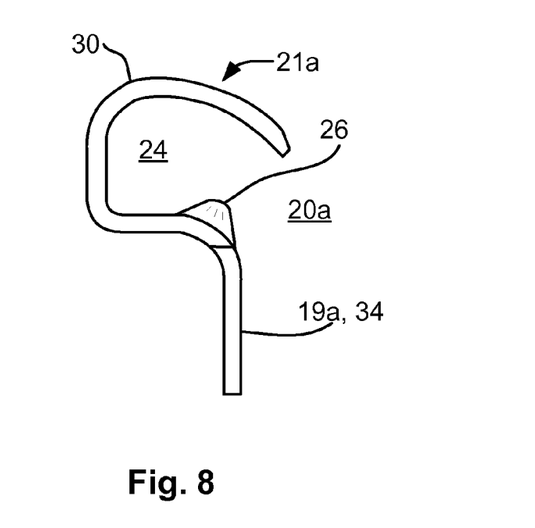
FIG. 8 is a toroidal view of the weight and clip of FIG. 7, where the toroidal view is taken along the line 8-8 of FIG. 7.

Turning to FIGS. 7 and 8, it is seen that in various embodiments of the present invention such a unitary weight 20a is essentially the clip 19 of FIGS. 5 and 6, except that the attaching portion 28 of the clip 21 of FIGS. 5 and 6 is instead a central portion 32 of the body 19a of the weight 20a of such FIGS. 7 and 8. Additionally, such central portion 32 is laterally flanked by and thus interposed between a pair of wing portions 34 such that the central portion 32 and wing portions 34 effectively combine to form the body 19a of such weight 20a of FIGS. 7 and 8.

Note that the body 19a as shown in FIG. 7 in particular is generally linear and not arcuate, as was the case with the body 19 shown in FIGS. 3 and 4. As may be appreciated, if the weight 20a is relatively small in mass such that the body 19a is relatively short in length (i.e., side-to-side in FIG. 7), such a linear body 19a may still nestle comfortably within the pocket 18 defined by the flange 15 of a wheel 12 when the weight 20a is mounted thereto. Otherwise, the body 19a may be formed to be arcuate in a manner akin to that of the body 19 of FIGS. 3 and 4.

Note too that the mass of the weight 20a is likely relatively small as compared to the mass of a similarly dimensioned weight 20 such as the weight 20 of FIGS. 3 and 4, where the body 19 thereof as formed would by its nature have more bulk. Nevertheless, such a weight 20a having such relatively small mass weight is still of use in situations where balancing a wheel 12 and/or tire 10 with wheel 12 only requires such a relatively small mass. Note further that although the mass of the weight 20a could be increased by increasing the arcuate length of the body 19a thereof, such arcuate length has an upper limit before the center of mass of such a weight 20a begins to noticeably shift away from the flange 15 and toward the central well 13 of the wheel 12 and alters the balancing function of such weight 20a.

Figure 9:
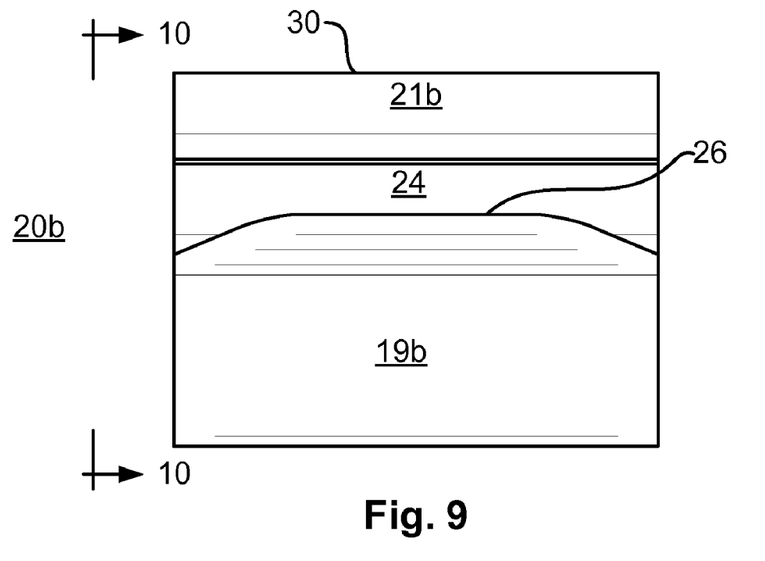
FIG. 9 is an inboard side view of a weight with a clip in accordance with yet another embodiment of the present invention.
Figure 10:
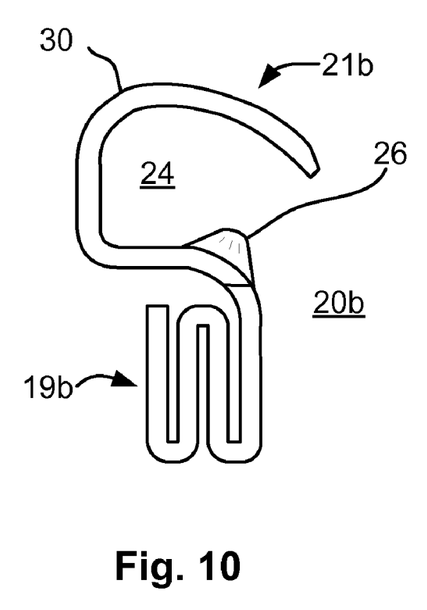
FIG. 10 is a toroidal view of the weight and clip of FIG. 9, where the toroidal view is taken along the line 10-10 of FIG. 9.

Turning to FIGS. 9 and 10, it is seen that in various embodiments of the present invention such a unitary weight 20b is essentially the clip 19 of FIGS. 5 and 6, except that the attaching portion 28 of the clip 21 of FIGS. 5 and 6 is highly elongate in a generally radial direction and is generally radially folded back on itself a number of times to form the body 19b of the weight 20b of such FIGS. 9 and 10, as is shown. That is to say, the radial length of that portion of a slug of sheet steel that is to form the body 19b of the weight 19b is multiple times the radial length of the formed body 19b, and such portion of the slug is folded in the radial direction one or more times to reduce such radial length to that of the formed body 19b. The radial length of that portion of the slug of sheet steel that is to form the body 19b of the weight 19b and prior to folding may of course vary depending on the mass desired for the formed weight 20b.

Additionally, the method of folding performed on the slug to form the body 19b may vary as deemed necessary and/or appropriate. For example, for a relatively few folds the portion of the slug that is to be the body 19b may be folded in halves. However, for more than a relatively few folds the portion of the slug that is to be the body 19b may be fan-folded in a manner such as that which is shown in FIG. 10. Note however that folding and the radial length of each fold are limited both by the radial length of the formed body 19b (i.e., top-to-bottom in FIG. 10), which should fit radially within the pocket 18 defined by the flange 15 of a wheel 12 when the weight 20b is mounted thereto, and by the axial length of the formed body 19b (i.e., side-to-side in FIG. 10), which should fit axially within the pocket 18 defined by the flange 15 of a wheel 12 when the weight 20b is mounted thereto. Thus, and with regard to a weight 20b such as that shown in FIGS. 9 and 10, the mass of the body 19b may be limited by how many folds can be fitted generally beneath the clip 21b of such weight 20b (i.e., toward the bottom in FIG. 10).

In a variation of the embodiments shown in FIG. 10 in particular, and referring now to FIG. 11, the body 19b may have only a single fold if desired. As also shown in FIG. 11, the folds may generally position the body 19b toward inboard (i.e., toward the right) as compared to the folds in the body 19b in FIG. 10, that generally position the body 19b toward outboard (i.e., toward the left). Note, though, that the number of folds extending toward inboard may be limited in the body 19b of FIG. 11 by space restrictions within the pocket 18 defined by the flange 15 of a wheel 12 when the weight 20b is mounted thereto. In particular, at some point inboard the flange 15 (not shown in FIG. 11) acts as a barrier to further inboard extension of the body 19b.

In a variation of the embodiments shown in FIGS. 9 and 10, and as may be appreciated, the body 19b of the weight 20b may instead be a central portion 32 that is laterally flanked by and thus interposed between a pair of laterally arranged wing portions 34 in a manner akin to that of the body 19a of FIG. 7 (not shown). In such a case, each wing portion 34 and the central portion 32 would be collectively formed from an elongate and widened portion of a slug of sheet steel, where such elongate and widened portion is the width of the formed body 19b and multiple times the radial length of the formed body 19b, and such portion of the slug is folded in the radial direction one or more times to reduce such radial length to that of the formed body 19b. If need be, the winged portions 34 as folded could be bent down to provide the overall body 19b with a more arcuate form. Such bending of the winged portions 34 may be accompanied by a twisting if necessary and/or desired.

CONCLUSION

In the foregoing description, it can be seen that the present invention comprises a new and useful wheel balancing weight 20 with a clip 21 and a body 19, where the clip 21 is constructed in such a manner so as to minimize or avoid scratching or marring the flange 15 of a wheel 12 when the clip 21 is mounted thereto and removed therefrom. The clip 21 is formed so as to avoid contacting the flange 15 of the wheel 12 at lateral edges of such clip 21, and includes a hump 26 extending into the compartment 24 defined thereby such that contact with the flange 15 occurs at such hump 26 rather than at the lateral edges of such clip 21.

In addition, the present invention comprises new and useful wheel balancing weights 20a, 20b formed to include the hump 26 in the clips 21a, 21b thereof, where the clip 21a, 21b and body 19a, 19b of each weight 20a, 20b is formed as a unitary member from a slug cut from sheet steel. The body 19a, 19b of each weight 20a, 20b may be formed by folding a corresponding portion of the slug one or more times into a shape that fits within the pocket 18 defined by the flange 15 of a wheel 12 to which the weight 20a, 20b is mounted.

It should be appreciated that changes could be made to the embodiments described above without departing from the inventive concepts thereof. For one example, the weights 20a, 20b may be formed without the hump 26 in the clips 21a, 21b, if advisable or if desired. For another example, the presence of a tire 10 is not essential to the present invention and the invention encompasses the use of the wheel balancing weight 20 to counter-balance the wheel 12 only. It should be understood, therefore, that this invention is not limited to the particular embodiments disclosed, but it is intended to cover modifications within the spirit and scope of the present invention as defined by the appended claims.

The invention claimed is:

1. A wheel balancing weight for mounting to a wheel with a flange, the weight having a body for providing a predetermined mass to the weight and a clip attached to the body, the clip for securely gripping the flange to mount the weight thereto, the clip having a springed shape defining a compartment within which is received the flange of the wheel, the clip including a hump projecting toward and into the defined compartment to contact a generally radially inward surface of the received flange such that the received flange contacts the clip at one or more relatively smooth medial contact points on the hump, the medial contact points being away from adjacent relatively sharp lateral edges of the clip, whereby the flange is not damaged by the relatively sharp lateral edges when received in and removed from the compartment defined by the clip, the hump including a generally laterally extending central plateau interposed between opposing lateral ramps, the central plateau being generally tangential with respect to the flange when the clip is mounted thereto, and being elevated more radially outwardly than the adjacent lateral edges of the clip, the ramps being at an angle to the central plateau such that each ramp transitions from the elevated plateau toward a respective adjacent lateral edge, each medial contact point being at about a juncture between the central plateau and a respective lateral ramp.

2. The weight of claim 1 wherein the clip has an attaching portion by which the clip is attached to the body and a gripping portion that defines the compartment and includes the hump.

3. The weight of claim 1 wherein the clip extends in a generally outwardly radial direction with respect to the mounted-to wheel and away from an outer radial face of the attached-to body, curves firstly to a generally outboard axial direction with respect to the mounted-to wheel and extends generally toward a plane defined by an outboard face of the body, then curves secondly to the generally outwardly radial direction and extends generally within such plane defined by the outboard face of the body and away from such body, then curves thirdly back to a generally inboard axial direction and extends generally toward a plane defined by an inboard face of the body, and then curves fourthly to a direction between the inboard axial direction and a generally inwardly radial direction and extends through the plane defined by the inboard face of the body and also radially inwardly to a distal end.

4. The weight of claim 3 wherein the radially inward surface of the received flange contacts the medial contact points on the hump at about where the clip curves firstly to the outboard axial direction, and wherein a generally radially outward surface of the received flange contacts a central contact point on the clip adjacent the distal end thereof and facing toward the compartment defined thereby.

5. The weight of claim 1 wherein a generally radially outward surface of the received flange contacts a central contact point on the clip adjacent a distal end thereof and facing generally radially inwardly toward the compartment defined thereby, and wherein the radially inward surface of the received flange contacts the medial contact points on the hump generally across the compartment from the central contact point and facing generally radially outwardly toward the compartment.

6. The weight of claim 5 wherein the central contact point is generally centered with respect to lateral edges of the clip and wherein each medial contact point is laterally displaced from the central contact point toward a respective lateral edge of the clip.

7. The weight of claim 1 wherein the hump is generally centered between the lateral edges of the clip and projects into the compartment generally outwardly radially and away from an outer radial face of the body and toward an area adjacent a distal end of the clip.

8. The weight of claim 1 wherein the central plateau is generally linear and the ramps are generally linear.

9. The weight of claim 8 wherein each medial contact point is at about a smoothed juncture between the central plateau and a respective lateral ramp.

10. The weight of claim 8 wherein the hump is smoothed in a direction normal to the tangential central plateau.

11. A clip for a wheel balancing weight for mounting to a wheel with a flange, the weight having a body for providing a predetermined mass to the weight and the clip attached to the body, the clip for securely gripping the flange to mount the weight thereto, the clip having a springed shape defining a compartment within which is received the flange of the wheel, the clip including a hump projecting toward and into the defined compartment to contact a generally radially inward surface of the received flange such that the received flange contacts the clip at one or more relatively smooth medial contact points on the hump, the medial contact points being away from adjacent relatively sharp lateral edges of the clip, whereby the flange is not damaged by the relatively sharp lateral edges when received in and removed from the compartment defined by the clip, the hump including a generally laterally extending central plateau interposed between opposing lateral ramps, the central plateau being generally tangential with respect to the flange when the clip is mounted thereto, and being elevated more radially outwardly than the adjacent lateral edges of the clip, the ramps being at an angle to the central plateau such that each ramp transitions from the elevated plateau toward a respective adjacent lateral edge, each medial contact point being at about a juncture between the central plateau and a respective lateral ramp.

12. The clip of claim 11 having an attaching portion by which the clip is attached to the body and a gripping portion that defines the compartment and includes the hump.

13. The clip of claim 11 extending in a generally outwardly radial direction with respect to the mounted-to wheel and away from an outer radial face of the attached-to body, curving firstly to a generally outboard axial direction with respect to the mounted-to wheel and extending generally toward a plane defined by an outboard face of the body, then curving secondly to the generally outwardly radial direction and extending generally within such plane defined by the outboard face of the body and away from such body, then curving thirdly back to a generally inboard axial direction and extending generally toward a plane defined by an inboard face of the body, and then curving fourthly to a direction between the inboard axial direction and a generally inwardly radial direction and extending through the plane defined by the inboard face of the body and also radially inwardly to a distal end.

14. The clip of claim 13 wherein the radially inward surface of the received flange contacts the medial contact points on the hump at about where the clip curves firstly to the outboard axial direction, and wherein a generally radially outward surface of the received flange contacts a central contact point on the clip adjacent the distal end thereof and facing toward the compartment defined thereby.

15. The clip of claim 11 wherein a generally radially outward surface of the received flange contacts a central contact point on the clip adjacent a distal end thereof and facing generally radially inwardly toward the compartment defined thereby, and wherein the radially inward surface of the received flange contacts the medial contact points on the hump generally across the compartment from the central contact point and facing generally radially outwardly toward the compartment.

16. The clip of claim 15 wherein the central contact point is generally centered with respect to lateral edges of the clip and wherein each medial contact point is laterally displaced from the central contact point toward a respective lateral edge of the clip.

17. The clip of claim 11 wherein the hump is generally centered between the lateral edges of the clip and projects into the compartment generally outwardly radially and away from an outer radial face of the body and toward an area adjacent a distal end of the clip.

18. The clip of claim 11 wherein the central plateau is generally linear and the ramps are generally linear.

19. The clip of claim 18 wherein each medial contact point is at about a smoothed juncture between the central plateau and a respective lateral ramp.

20. The clip of claim 18 wherein the hump is smoothed in a direction normal to the tangential central plateau.

* * * * *